United States Patent [19]

McDonagh et al.

[11] Patent Number: 5,186,439
[45] Date of Patent: Feb. 16, 1993

[54] FRICTION COMPENSATING AUTOMOTIVE SUSPENSION STRUT

[75] Inventors: Lawrence P. McDonagh, Canton; William H. Clarke, Farmington Hills; Jonathan D. Stinson, Plymouth; John V. Lopez, Dearborn, all of Mich.

[73] Assignee: Ford Motor Company, Dearborn, Mich.

[21] Appl. No.: 756,020

[22] Filed: Sep. 6, 1991

[51] Int. Cl.⁵ .................................. F16F 1/42
[52] U.S. Cl. .................................. 267/35; 188/315; 188/271; 267/64.26; 267/64.27; 267/220
[58] Field of Search ............ 267/35, 201, 219, 220, 267/221, 150, 141.1-141.5, 153, 64.13, 64.15, 64.24, 64.26, 64.27, 122; 188/280, 287, 286, 129, 315, 322.11, 322.17, 322.19, 322.14, 271

[56] References Cited

U.S. PATENT DOCUMENTS

| | | | |
|---|---|---|---|
| 2,207,088 | 7/1940 | Coleman | 264/64.26 |
| 3,573,880 | 4/1971 | Sakai | 280/96.2 |
| 3,750,856 | 8/1973 | Kenworthy | 188/287 |
| 3,797,366 | 3/1974 | Hanes et al. | 188/286 |
| 3,819,167 | 6/1974 | Nakamura et al. | 267/35 |
| 4,054,277 | 10/1977 | Sirven | 188/315 X |
| 4,372,545 | 2/1983 | Federspiel | 188/280 |
| 4,482,035 | 11/1984 | Heideman et al. | 188/287 |
| 4,615,537 | 10/1986 | Damon | 280/668 |
| 4,765,444 | 8/1988 | Bauer et al. | 188/129 |
| 4,828,237 | 5/1989 | Neff | 267/221 |
| 4,934,667 | 6/1990 | Pees et al. | 188/322.17 |
| 4,934,730 | 6/1990 | Okuzumi | |
| 5,070,970 | 12/1991 | Johnston et al. | 188/315 |

FOREIGN PATENT DOCUMENTS 2141518 12/1984 United Kingdom .................. 267/35

Primary Examiner—Matthew C. Graham
Attorney, Agent, or Firm—Raymond L. Coppiellie; Roger L. May

[57] ABSTRACT

A strut assembly for use in an automotive suspension of a vehicle including a wheel carrier and a chassis includes an outer housing attached to the wheel carrier, a pressure tube disposed within the outer housing, a piston slidably carried within the pressure tube and disposed at the lower end of a piston rod. The outer housing of the strut assembly moves axially relative to the pressure tube under imposition of an axial load upon the strut. The strut assembly can further overcome the static friction forces contained within the strut assembly at a much lower axial input force than in conventional strut designs.

7 Claims, 3 Drawing Sheets

FRICTION COMPENSATING AUTOMOTIVE SUSPENSION UNIT

BACKGROUND OF THE INVENTION

1. Field of the Invention

The present invention relates generally to an automotive shock absorber strut assembly for use in an automotive suspension. More particularly, the present invention relates to a shock absorber strut assembly which utilizes the unsprung vehicle mass to overcome breakaway friction in the strut.

2. Disclosure Information

Automotive suspension struts have two primary functions: to provide structural support and to permit hydraulically damped suspension motion. Typically, the strut is rigidly mounted to a wheel carrier at one end and pivotally mounted to the vehicle chassis at its other end. As used herein, the term "chassis" refers to either a conventional vehicle chassis or to a conventional unitary chassis and body construction and is intended to include vehicle structure and components connected to or supported upon the chassis structure and forming part of the sprung mass of the vehicle Also, the term, "sprung mass" refers to the body or chassis of the vehicle while "unsprung mass" refers to the roadwheel assembly, its associated rotating members as well as locating members such as suspension arms, etc. The mounting geometry of the strut relative to the wheel carrier causes radially directed sideloading of strut piston and rod bearing. This sideloading is undesirable inasmuch as the static friction resulting therefrom increases the force necessary to initiate sliding of the piston within the strut and, therefore, correspondingly increases the transmissibility of road-induced vibration from the wheel to the chassis of the vehicle when an obstruction is encountered on the roadway surface. During this strut binding, the desired damping action of the suspension does not occur. The force necessary to initiate sliding of the piston within the strut is also known as a breakaway force.

Attempts to minimize this undesirable static friction have resulted in various strut configurations. For example, U.S. Pat. No. 3,573,880 discloses a strut wherein the spring is eccentrically mounted about the strut. U.S. Pat. No. 4,615,537, assigned to the assignee of the present invention, discloses another design for reducing the static friction in a strut. The '537 patent discloses a telescoping strut including means for reducing static friction within the strut by causing either the upper end, the lower end or both ends of the strut to be rotated outboard with respect to the axis of the strut. Although these solutions can result in reduction of the strut friction, neither of these designs utilize the unsprung vehicle mass to overcome the friction forces in the strut.

It is an advantage of the present invention to provide a suspension strut assembly which provides superior ride characteristics by allowing strut motion and energy storing spring deflection at a lower road force input than by conventional struts. Energy stored in the spring is not transmitted to the vehicle structure but is hydraulically damped by the strut.

These and other objects, features and advantages of the present invention will be apparent from the summary, drawings, detailed description and claims which follow.

SUMMARY OF THE INVENTION

In accordance with the present invention, a strut assembly for use in an automotive suspension of a vehicle including a wheel carrier and a chassis comprises an outer housing attached to the wheel carrier, a pressure tube disposed within the outer housing, a piston slidably carried within the pressure tube and a piston rod having a lower end attached to the piston and an upper end attached to the chassis of the vehicle. The strut assembly further includes means for permitting the outer housing a limited amount of movement relative to the pressure tube under imposition of an axial load upon the strut. The strut assembly of the present invention may further comprise means for overcoming a static friction force developed within the strut to initiate reciprocal movement of the piston within the pressure tube so that the strut assembly damps lower amplitude road input disturbances than in conventional strut assemblies. There is further disclosed herein an automotive vehicle suspension comprising a wheel carrier and a strut assembly structured generally in accord with that described above.

DETAILED DESCRIPTION OF THE PREFERRED EMBODIMENTS

Figure 1:
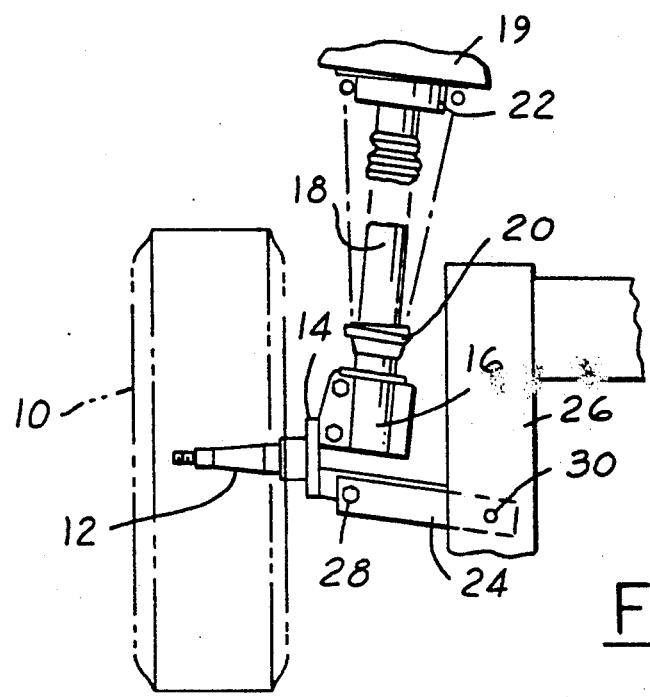
FIG. 1 is a front elevation, partially broken away, of a strut type suspension having a shock absorber strut assembly structured in accord with the principles of the present invention.

As shown in FIG. 1, an example of an automotive suspension suitable for use with the present invention comprises wheel and tire assembly 10 rotatably mounted upon spindle 12 integral with wheel carrier 14. Wheel carrier 14 also includes a socket 16 which accepts the lower end of strut assembly 18 which is rigidly mounted to the wheel carrier. An upper strut mount 22 connects the upper end of strut 18 to the chassis 26 of the vehicle and a coil spring 20 is mounted circumferentially about strut 18. A control arm 24 is connected at its inboard end to chassis 26 by an inboard pivot 30 and at its outboard end to wheel carrier 14 by an outboard pivot 28.

Figure 3:
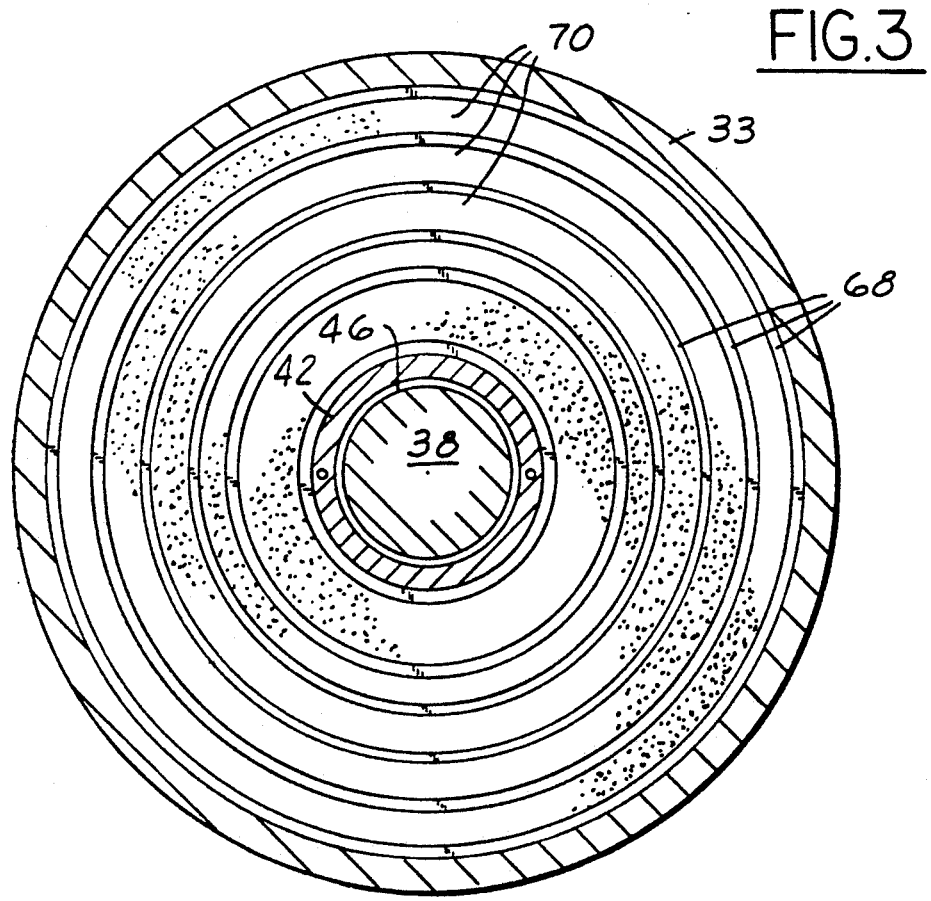
FIG. 3 is a cross-sectional view along line 3—3 of FIG. 2.
Figure 2:
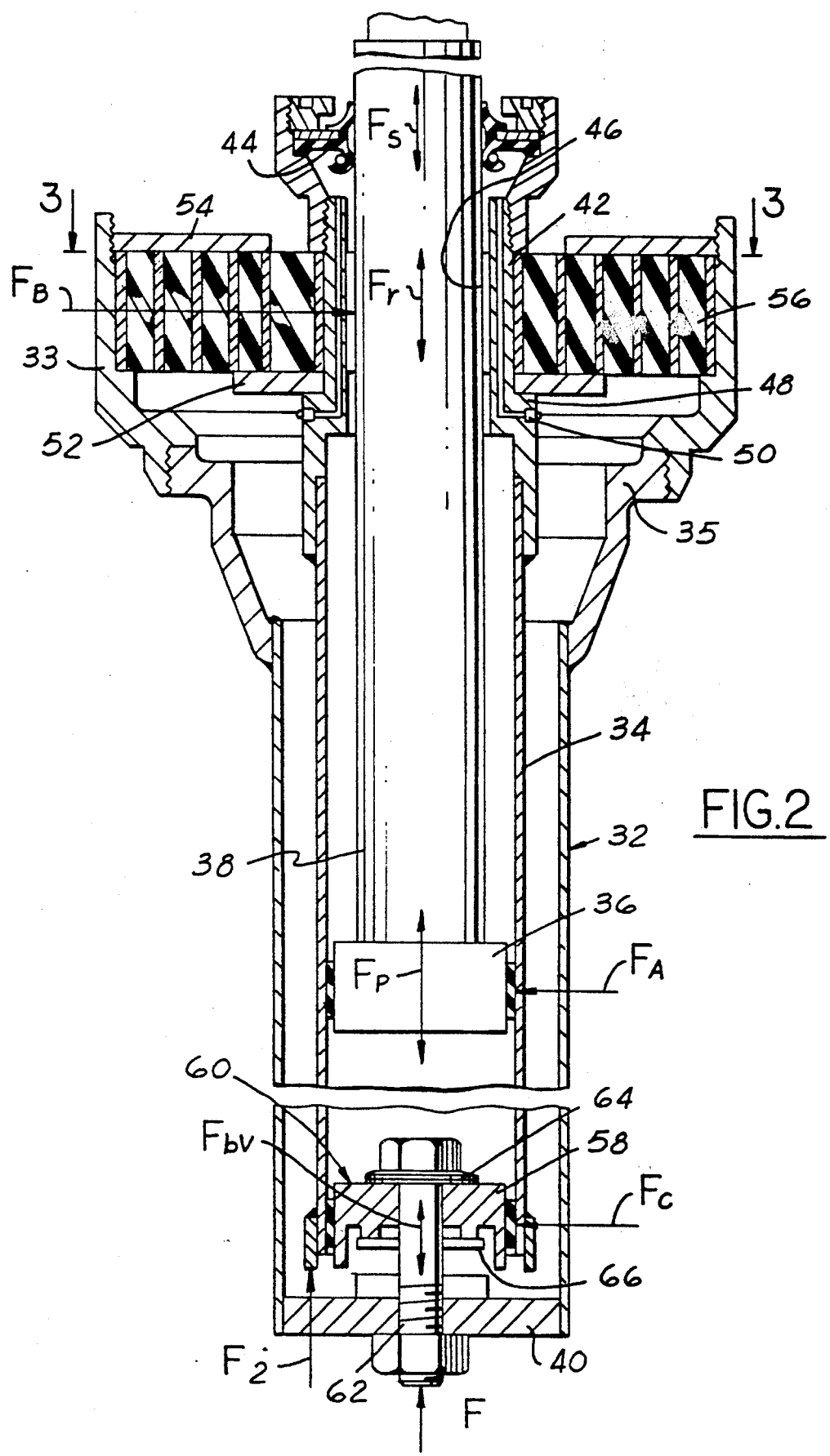
FIG. 2 is a front elevation, cross-sectional view of the strut shown in FIG. 1, showing static forces normally acting upon the strut assembly.

Referring now to FIGS. 2 and 3, strut assembly 18 further includes an outer housing 32 having an upper portion 33 threadably connected to a lower portion 35. However, it should be readily apparent to those skilled in the art that a one-piece construction could be utilized as well. The strut assembly 18 further includes a pressure tube 34 disposed within the outer housing 32. As can be seen in FIG. 2, the lowermost end of outer housing 32 is separated from the lowermost end of pressure tube by a distance of approximately two to ten millimeters to allow for relative axial movement therebetween.

The strut assembly 18 further includes a piston 36 which reciprocates within pressure tube 34. The piston 36 is connected to the lower end of a piston rod 38 which passes into the pressure tube 34 through a rod guide assembly 42.

The rod guide assembly 42 includes a rod guide bearing 46 circumferentially surrounding the piston rod 38 and a rod seal 44 securing the rod guide assembly 42 in position with respect to the piston rod 38. The rod guide assembly 42 surrounds the piston rod 38 such that first and second friction surfaces are defined by the interface of the piston rod 38 with the rod seal 44 and the piston rod 38 with the rod guide bearing surface 46, respectively. A third friction surface is defined at the piston 36 to pressure tube 34 interface. As will be explained more fully below, in a strut of the present invention a fourth friction surface is defined by the interface of the strut base valve assembly 60 and the pressure tube 34.

The rod guide assembly 42 can also include a check valve 50 of conventional design which equalizes pressure in the strut in a known manner and a shoulder 48 supporting a lower retainer 52. A collar 56 is interposed between the lower retainer 52 and an upper retainer 54 fixedly secured in the upper portion 33 of the housing 32. As will further be explained in greater detail below, collar 56 provides means for permitting the outer housing 32 a limited amount of movement relative to pressure tube 34 under imposition of an axial load upon the strut assembly 18.

The strut assembly of the present invention further includes a base valve assembly 60 disposed at the lower end of the strut 18. The base valve assembly 60 is secured to a base cap 40 of the outer housing 32 by means of a threaded rod and nut fastener 62. The base valve assembly 60 reciprocates within the pressure tube 34 upon axial movement of the outer housing 32 relative to the pressure tube 34 during jounce movement of the unsprung vehicle mass. The base valve assembly 60 may comprise any a number of known base valve assemblies, including, but not limited to, those having a piston assembly 58, disposed between spring steel disks 64, 66 respectively. It should be readily apparent to those skilled in the art that the piston 58 may include metering orifices, notches, or other flow restrictive means to provide hydraulic damping as the outer housing 32 moves relative to pressure tube 34. As such, the base valve assembly 60 provides means for damping spring and suspension deflection initiated by road input forces below a predetermined value as will be explained hereinafter.

Referring now to FIG. 3, collar 56 comprises a plurality of elastomeric annuli, or rings 70 interposed between a plurality of metal rings 68. The elastomeric rings 70 are bonded to the metal rings 68 during fabrication so that under the imposition of an axial load generally parallel with the axis of the strut, such as occurs when the outer housing 32 moves relative to the pressure tube 34, the elastomeric rings 70 shear with respect to the metal rings 68. The elastomeric rings 70 may be manufactured from a material selected from a group of known synthetic elastomeric materials such as EPDM, nitrile, neoprene, butyl rubber, polyurethane or other known synthetic elastomeric materials. It is important that the elastomeric material have a high spring rate in a direction generally perpendicular to the axis of the strut to minimize lateral displacement of the outer housing 32 relative to the pressure tube 34 under side loading on the strut and to prevent unwanted noise or vibration developed during normal operation of the strut. The elastomeric material of collar 56 should have a lower spring rate in the direction generally parallel with the axis of the strut to allow outer housing 32 to move relative to the pressure tube 34 without difficulty.

Figure 4:
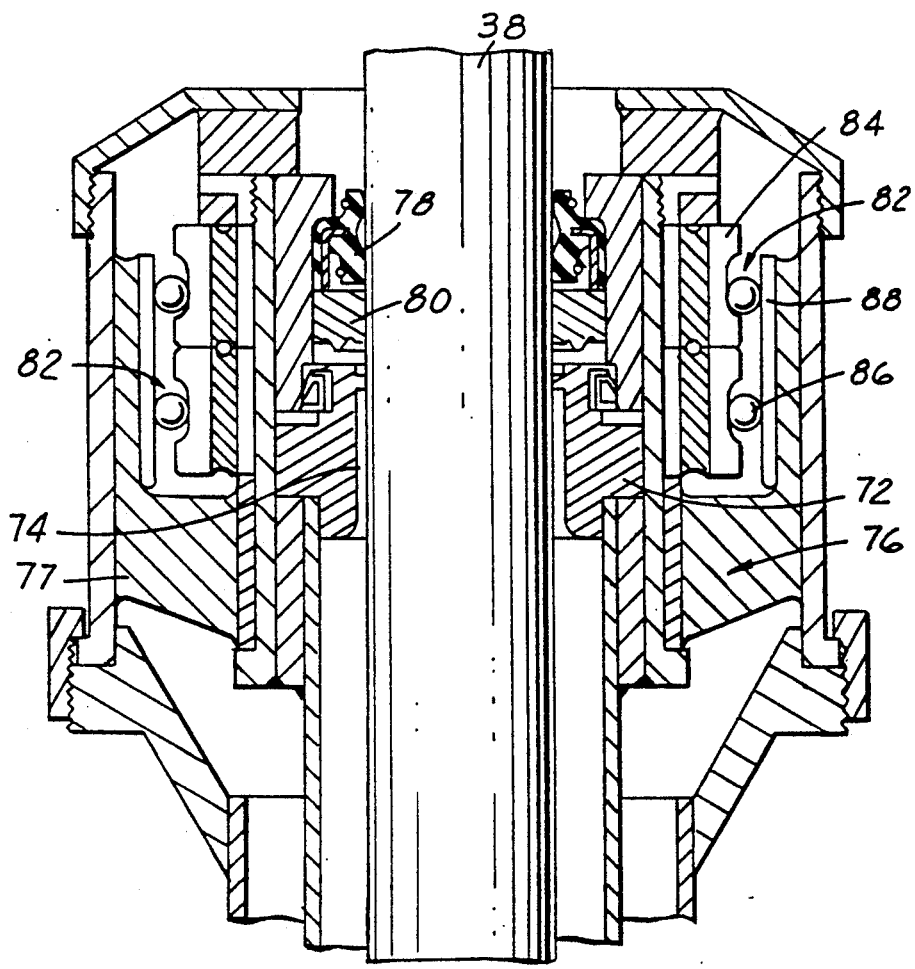
FIG. 4 is a front elevation, cross-sectional view of an alternative embodiment of the strut assembly shown in FIG. 1.

FIG. 4 illustrates a second embodiment of a strut assembly structured in accord with the principles of the present invention providing means for allowing the outer housing 32 to move relative to the pressure tube 34 under the imposition of an axial load along the axis of the strut. The strut assembly includes a rod guide 72 having a rod guide bearing 74 circumferentially surrounding the piston rod 38. The strut further includes a conventional gas and oil seal 78, 80.

The strut assembly of FIG. 4 includes a collar 76 for permitting relative axial movement of the outer housing 32. Collar 76 includes a generally elastomeric bushing 77 and a plurality of bearing assemblies 82 disposed therein The bearing assemblies 82 include an inner race 84, an outer race 88 and ball bearings 86 disposed therebetween In operation, when an axial load is applied along the axis of the strut in the jounce direction, the outer race 88 rides upon ball bearings 86 trapped within the inner race 84 of the bearing assemblies 82. The ball bearing assemblies 82 provide a low vertical shear rate for the collar 76 to permit the outer housing 32 to move easily relative to the pressure tube 34.

In operation and as will be explained with reference to FIG. 2, the strut assembly of the present invention provides means for overcoming a predetermined "breakaway friction force" within the strut to initiate reciprocating movement of the piston 36 within the pressure tube 34 at a smaller roadwheel vertical displacement than with conventional strut assemblies. In doing so, a strut assembly of the present invention provides a smoother vehicle ride than does a conventional strut assembly.

The breakaway friction force is the sum of the forces developed at the friction surface interfaces of the strut assembly As explained above, there are four such interfaces in the strut assembly of the present invention. These include the interfaces between the piston rod 38 and the rod guide seal 44 and the rod guide bearing 46 as well as the interfaces between the pressure tube 34 and the piston 36 and the base valve piston assembly 58.

Referring now to FIG. 2, the force of the vehicle's weight and the road input force, labeled $F_1$, acts upward through spindle 12 and ultimately strut assembly 18. This force creates an upward acting bending moment or torque which must be counteracted by strut 18 In a conventional strut, this counteraction produces forces $F_A$ acting radially upon piston 36 and $F_B$ acting radially upon piston rod 38. Additionally, seal friction, $F_S$, is present between the piston rod 38 and the rod seal 44. Forces $F_A$ and $F_B$ produce frictional forces $F_p$ and $F_r$, which with $F_s$ act upon piston 36 and the piston rod 38 in a direction parallel and opposite to the telescopic motion of strut 18. These friction forces comprise a relatively unpredictable addition to the spring rate of coil spring 20 causing the vehicle suspension to have a harsher operating characteristic than would otherwise be possible were these forces minimized. The sum of forces $F_p$, $F_r$ and $F_s$ equals the breakaway friction force, $F_X$, which must be overcome before piston 36 will reciprocate within the pressure tube 34.

The present invention provides means for overcoming the breakaway friction force $F_X$ at a lower road input force than in conventional struts to provide a smoother vehicle ride. In a strut of the present invention, $F_1$ creates an upward acting bending moment or torque which must be counteracted. This counteraction produces forces $F_A$ acting radially upon piston 36, $F_B$ acting radially upon piston rod 38, $F_C$ acting radially upon the base valve assembly as well as $F_s$ as described above. Forces $F_A$, $F_B$ and $F_C$ produce frictional forces $F_p$, $F_r$ and $F_{bv}$ acting upon piston 36, the piston rod 38, and the base valve piston 58, respectively, in a direction parallel and opposite to the telescopic motion of strut 18. These friction forces combined with seal friction $F_s$ comprise a relatively unpredictable addition to the spring rate of coil spring 20 as described above In the present invention, the axial force $F_1$ only has to exceed $F_{bv}$ to overcome the breakaway friction force $F_X$ as will be explained below.

Figure 5:
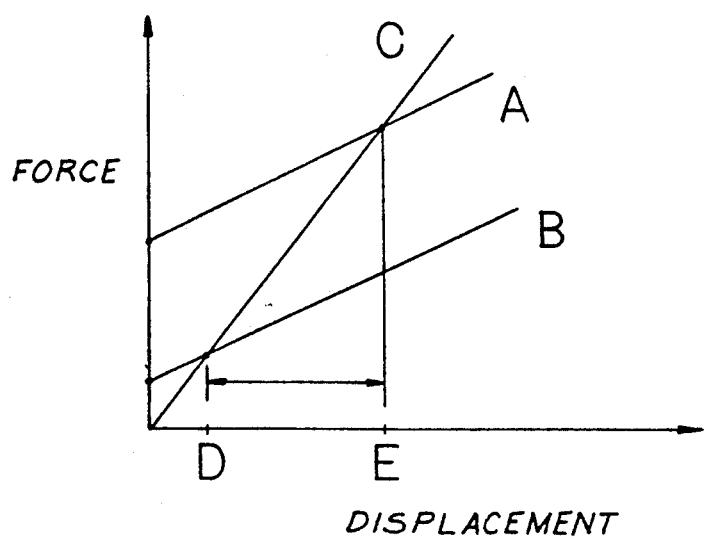
FIG. 5 is a plot of force versus displacement curves for comparing the function of a conventional strut assembly to a strut assembly structured in accord with the principles of the present invention.

As can be seen in FIG. 2, the outer housing 32 is displaced a distance of between 2-10 millimeters from the pressure tube 34. Under the imposition of an axial load along the axis of the strut, the outer housing 32 moves this distance until it contacts the pressure tube 34. It should be readily apparent to those skilled in the art that outer housing 32 can contact the pressure tube at the base cap 40 or at other locations along the length of the strut, such as between the outer housing and rod guide assembly at the opposite end of the strut. The present invention is not meant to be limited solely to an embodiment wherein the outer housing contacts the pressure tube at the base cap 40. FIG. 5 shows the effect of the suspension strut of the present invention on overcoming the friction forces within the strut to reduce the amount of noise, vibration and harshness transmitted to the vehicle body.

As shown in FIG. 5, force is plotted on the ordinate while the displacement of the wheel/strut assembly is plotted along the abscissa. Line A represents the friction forces acting in a conventional strut wherein the outer reservoir housing tube is fixed with respect to the pressure tube. The slope of line A is positive because the friction forces increase as the side loading upon the strut increases due to an increase in the magnitudes of the wheel input and spring forces. Line B represents the friction forces in the strut assembly according to the present invention. As with line A, the slope of line B is positive, although line A is not necessarily parallel to line B. Line C represents the axial force acting upon the strut due to road inputs. As can be seen in FIG. 5, the intersection of line C with line A indicates the point at which damping of road forces begins with a conventional strut; all road forces below this point reach the vehicle body undamped and are felt by the vehicle occupants. The intersection of line B with line C indicates the point at which strut actuation and spring absorption begins with a strut of the present invention. As can be seen, storing energy in the spring begins at significantly lower road force input and at smaller strut displacement with a strut assembly according to the present invention (point D) than with a conventional strut assembly (point E). This results because the strut assembly according to the present invention utilizes the unsprung mass of the suspension components, which includes the mass of the wheel and tire assembly, the rotor assembly, the spindle, other braking components, and part of the mass of the suspension arms and the strut, to overcome the friction forces developed at the rod seal, the rod guide, the piston/pressure tube and the base valve/pressure tube interfaces. In a conventional strut design, the outer housing is fixed relative to the pressure tube and the mass of the unsprung suspension components does not add any additional force along the axis of the strut. However, in the present invention, an additional force is created when the road force is encountered. The additional force results from the fact that the outer housing moves relative to the pressure tube of the strut assembly. The movement of the outer housing relative to the pressure tube corresponds to movement of the unsprung vehicle mass, resulting in an acceleration of the unsprung mass. The unsprung vehicle mass multiplied by its acceleration results in an additional force acting along the axis of the strut. This force, shown as $F_2$ in FIG. 2, causes the outer housing 32 to impact the pressure tube 34 with a relatively large force $F_2$ which exceeds the breakaway friction force of strut so that movement of piston 36 begins upon impact. Since the sum of forces $F_1$ and $F_2$ is greater than the breakaway friction force $F_X$ of the present invention, the piston begins to reciprocate within the pressure tube 34 as soon as $F_2$ develops. However, since the piston begins to reciprocate at a much lower road input force than in a conventional design, energy previously transmitted to the vehicle can now be stored in the spring and hydraulically damped by the strut. Therefore, a smoother vehicle ride results.

It should be readily apparent to those skilled in the art that many variations and permutations of the present invention are possible. For example, the base valve assembly 60 may be structured in such a way as to provide various degrees of damping of road input forces between the occurrence of impact of the pressure to the outer housing by simply designing the metering orifices contained within the base valve assembly to absorb such input forces. Also, the use of the present invention can allow the upper strut mounting to be of a higher spring rate elastomer than in prior art devices since the more resilient material is no longer necessary to isolate vibrations at force input magnitudes lower than the total breakaway force of the strut assembly. It is the following claims, including all equivalents which define the scope of the invention.

We claim:

1. A suspension apparatus for an automotive vehicle, comprising:
    a strut interposed between a sprung and unsprung mass of said vehicle and adapted to provide structural support between said sprung and unsprung masses and to hydraulically damp relative motion therebetween, said strut comprising:
    an outer housing attached to said unsprung mass;
    a pressure tube disposed within said outer housing;
    a piston slidably carried within said pressure tube;
    a piston rod having a lower end attached to said piston and an upper end attached to the sprung mass of said automotive vehicle; and
    means for permitting said outer housing a limited amount of movement relative to said pressure tube under imposition of an axial load upon said strut.

2. A suspension apparatus according to claim 1, wherein said strut further comprises a base cap disposed at one end thereof, said base cap being operative to contact said pressure tube in response to said axial load on said unsprung mass.

3. A suspension apparatus according to claim 1, wherein said means for permitting said outer housing a limited amount of movement relative to said pressure tube comprises an elastomeric bushing disposed between said piston rod and an interior surface of said outer housing.

4. A suspension apparatus according to claim 3, wherein said elastomeric bushing further includes at least one bearing assembly circumferentially disposed proximate an outer surface of said piston rod.

5. A suspension apparatus according to claim 3, wherein said elastomeric bushing comprises a plurality of concentric annuli and further comprising a plurality of rigid spacers disposed between each annulus of said plurality of annuli.

6. A suspension apparatus according to claim 5, wherein each annulus of said plurality of annuli are bonded to said rigid spacers adjacent said annulus so that said annuli are operative to shear relative to said spacers upon movement of said outer housing relative to said pressure tube.

7. An automotive vehicle suspension, comprising:
an unsprung vehicle mass including a wheel carrier;
a strut comprising:
    an outer housing attached to said wheel carrier;
    a pressure tube disposed within said outer housing;
    a piston slidably carried within said pressure tube and defining a first friction surface therebetween;
    a piston rod having a lower end attached to said piston and an upper end attached to the chassis of said automotive vehicle and defining a second friction surface between said outer housing and said rod;
    a rod guide circumferentially disposed around said piston rod and defining a third friction surface therebetween;
    a base cap disposed at one end of said housing; and
    an elastomeric bushing disposed between said piston rod and said rod guide for permitting said outer housing a limited amount of movement relative to said pressure tube so that under the imposition of road force inputs against said unsprung mass, said base cap is operative to impact said pressure tube to overcome a breakaway friction force developed at said first, second and third friction surfaces, said bushing comprising a plurality of concentric annuli, a plurality of rigid spacers disposed between each annulus of said plurality of annuli and a plurality of bearings circumferentially disposed proximate an outer surface of said piston rod.

* * * * *